US011418538B2

(12) United States Patent
Hutchinson et al.

(10) Patent No.: US 11,418,538 B2
(45) Date of Patent: Aug. 16, 2022

(54) METHOD, APPARATUS, AND SYSTEM TO MAP NETWORK REACHABILITY

(71) Applicant: Darktrace Limited, Cambridge (GB)

(72) Inventors: Robert Hutchinson, Nottingham (GB); Alex Markham, Cambridgeshire (GB); Krystian Szczur, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 106 days.

(21) Appl. No.: 16/677,982

(22) Filed: Nov. 8, 2019

(65) Prior Publication Data

US 2020/0244699 A1 Jul. 30, 2020

Related U.S. Application Data

(60) Provisional application No. 62/796,507, filed on Jan. 24, 2019.

(51) Int. Cl.
*H04L 29/06* (2006.01)
*H04L 9/40* (2022.01)
(Continued)

(52) U.S. Cl.
CPC ........... *H04L 63/145* (2013.01); *G06N 20/00* (2019.01); *H04L 43/12* (2013.01);
(Continued)

(58) Field of Classification Search
CPC .............. H04L 63/145; H04L 63/1416; H04L 63/1491; H04L 63/20; H04L 63/1425;
(Continued)

(56) References Cited

U.S. PATENT DOCUMENTS 10,944,758 B1 * 3/2021 Nagargadde ............ H04L 63/20
2004/0117478 A1 * 6/2004 Triulzi ................ H04L 63/1416
709/224
(Continued)

OTHER PUBLICATIONS

Oracle Linux blog—"Mapping your network with nmap" Published Feb. 21, 2011 (6 pages) https://blogs.oracle.com/linux/post/mapping-your-network-with-nmap (Year: 2011).*
(Continued)

*Primary Examiner* — Joseph P Hirl
*Assistant Examiner* — Thomas A Gyorfi
(74) *Attorney, Agent, or Firm* — Rutan & Tucker, LLP

(57) ABSTRACT

The network reachability module maps and dynamically tracks network reachability of network addresses and/or devices. The network reachability module can map and dynamically track network reachability of a response-orchestrator engine, via communicating and cooperating with the response-orchestrator engine. The network reachability module has a tracking module to 1) monitor network traffic and 2) keep a list of known devices and/or known subnets on the network, which is dynamically tracked and updated as previously unknown devices and subnets on the network are detected. A trigger module generates a spoofed transmission and/or response communication, supported by a network protocol used by the network. The spoofed transmission and/or response communication can be used to map network reachability of i) network devices, ii) network addresses, and iii) any combination of both, which either 1) can receive or 2) cannot receive protocol communications from a host for the network reachability module in the network.

20 Claims, 9 Drawing Sheets

(51) Int. Cl.
*G06N 20/00* (2019.01)
*H04L 43/12* (2022.01)
*H04L 41/22* (2022.01)

(52) U.S. Cl.
CPC ...... *H04L 63/1416* (2013.01); *H04L 63/1425* (2013.01); *H04L 63/1433* (2013.01); *H04L 63/1491* (2013.01); *H04L 63/20* (2013.01); *H04L 41/22* (2013.01)

(58) Field of Classification Search
CPC ..... H04L 63/1433; H04L 43/12; H04L 41/22; H04L 43/0876; H04L 43/045; H04L 41/14; H04L 41/16; G06N 5/003; G06N 7/005; G06N 20/00
See application file for complete search history.

(56) References Cited

U.S. PATENT DOCUMENTS

| 2015/0033340 | A1* | 1/2015 | Giokas | H04L 63/1441 |
| | | | | 726/23 |
| 2016/0359699 | A1* | 12/2016 | Gandham | H04L 43/0805 |
| 2017/0085459 | A1* | 3/2017 | Xia | H04L 43/0852 |
| 2017/0289187 | A1* | 10/2017 | Noel | G06F 16/28 |

OTHER PUBLICATIONS

Nmap(1)—Linux man page. Article dated Oct. 3, 2016 as verified by the Internet Archive (56 pages) http://web.archive.org/web/20161003144917/https://linux.die.net/man/1/nmap (Year: 2016).*

Gordon "Fyodor" Lyon. Excerpt from "NMAP Network Scanning" [ISBN 978-0-9799587-1-7], chapter 5: "TCP Idle Scan (-si)" article dated Mar. 5, 2016 as verified by the Internet Archive (7 pages). http://web.archive.org/web/20160305044437/https://nmap.org/book/idlescan.html (Year: 2016).*

Table of contents from "NMAP Network Scanning" from Gordon "Fyodor" Lyon, dated Mar. 5, 2016 as verified by the Internet Archive (12 pages) (Year: 2016).*

* cited by examiner

METHOD, APPARATUS, AND SYSTEM TO MAP NETWORK REACHABILITY

RELATED APPLICATION

This application claims priority to and the benefit of under 35 USC 119 of U.S. provisional patent application titled "A Cyber Security System," filed Jan. 24, 2019, Ser. No. 62/796,507, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber security appliance. In an embodiment, a module potentially using Artificial Intelligence autonomously maps out network reachability, which subsequently can be used for a number of functions including figuring out what types of actions can be taken against Cyber Security threats.

BACKGROUND

In the cyber security environment, firewalls, endpoint security methods and other tools such as SIEMs and sandboxes are deployed to enforce specific policies, and provide protection against certain threats. These tools currently form an important part of an organization's cyber defense strategy, but they are insufficient in the new age of cyber threat. Legacy tools are failing to deal with new cyber threats because the traditional approach relies on being able to pre-define the cyber threat in advance, by writing rules or producing signatures.

Generally, a human operator must provide a cyber threat defence system with specific routes through the network topology that a defence mechanism can take to block specific areas of the network to prevent a cyber threat. Generally, the human operator must also manually test each area of the network to confirm if it is reachable by the defence mechanism. Instead what is needed is a cyber threat defense system that includes one or more cyber security appliances that can autonomously protect a network system and automatically devise routes through the network structure for its defence mechanisms without human assistance.

SUMMARY

Various methods, apparatuses, and systems are discussed for a cyber security appliance. In an embodiment, the network reachability module maps and dynamically tracks network reachability of network addresses and/or devices. The network reachability module can map and dynamically track network reachability of a cyber-security response-orchestrator engine, via communicating and cooperating with the cyber-security response-orchestrator engine. The cyber-security response-orchestrator engine can autonomous take actions, without a human to initiate the actions, to mitigate a detected cyber threat.

The network reachability module has a tracking module to 1) monitor network traffic and 2) keep a list of known devices and/or known subnets on the network, which is dynamically tracked and updated as previously unknown devices and subnets on the network are detected. In an embodiment, the tracking module does not necessarily need to have knowledge of any network devices beforehand; rather, the only knowledge the tracking module needs is the list of subnets that the system should focus on. Likewise, the tracking module need not be aware of how many devices are in each subnet; rather, just that the device is in a subnet for spoofing purposes.

The network reachability module has a trigger module configured to cooperate with the tracking module. The trigger module generates a spoofed transmission and/or response communication, supported by a network protocol used by the network. The spoofed transmission and/or response communication formatted in the network protocol used by the network can be used to map network reachability of i) network devices, ii) network addresses, and iii) any combination of both, which either 1) can receive or 2) cannot receive protocol communications from a location of a host for the network reachability module in the network.

These and other features of the design provided herein can be better understood with reference to the drawings, description, and claims, all of which form the disclosure of this patent application.

DRAWINGS

The drawings refer to some embodiments of the design provided herein in which.

Figure 3:
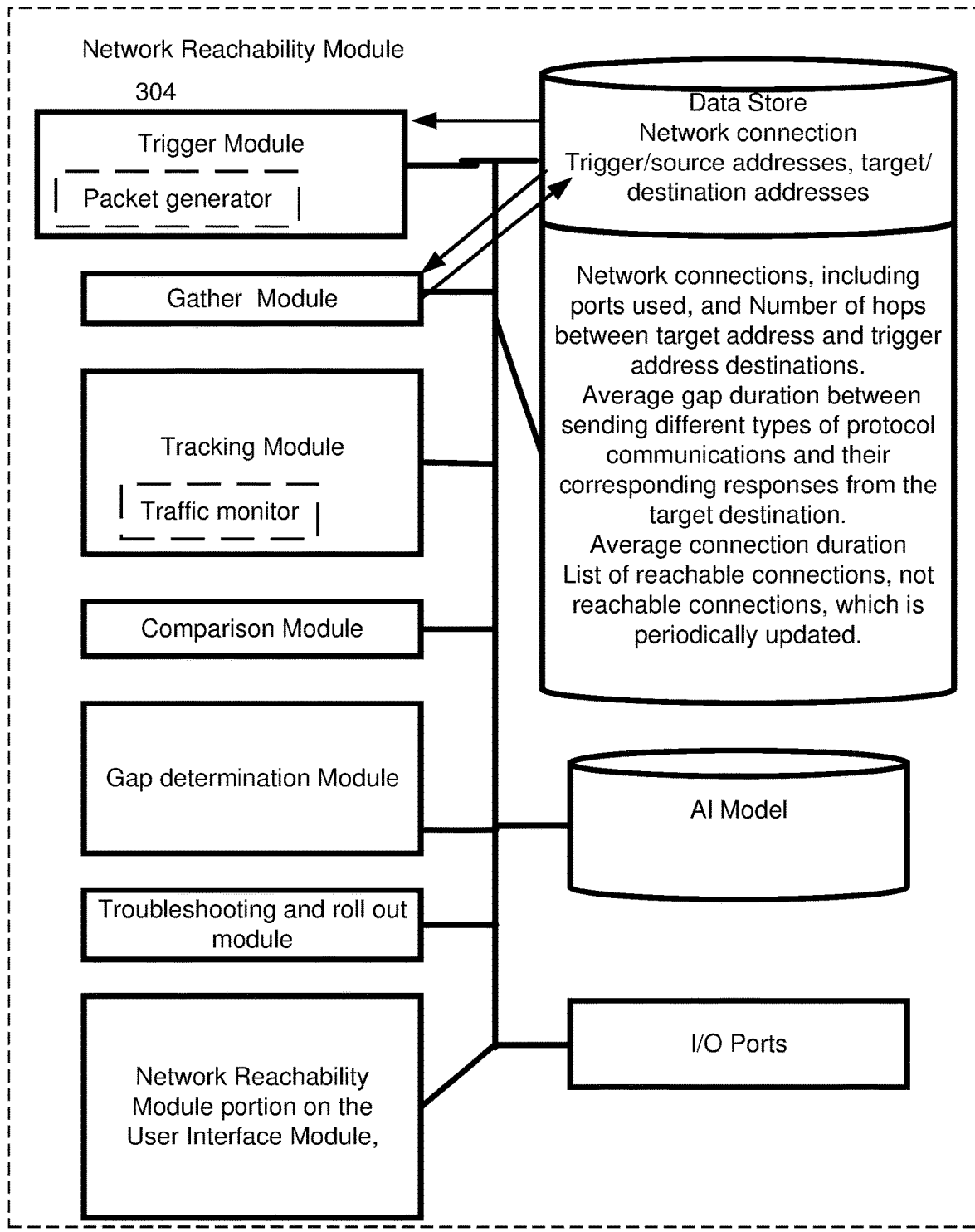

FIG. 3 illustrates a block diagram of an embodiment of the network reachability module to combine i) the tracking module's monitoring of network traffic and keeping the list of known devices and/or known subnets on the network, with ii) the trigger module's autonomous periodic generation of the spoofed transmission and/or response communication to check whether if at least one network address in each subnet, for each of the known subnets, can be reached.

Figure 4:
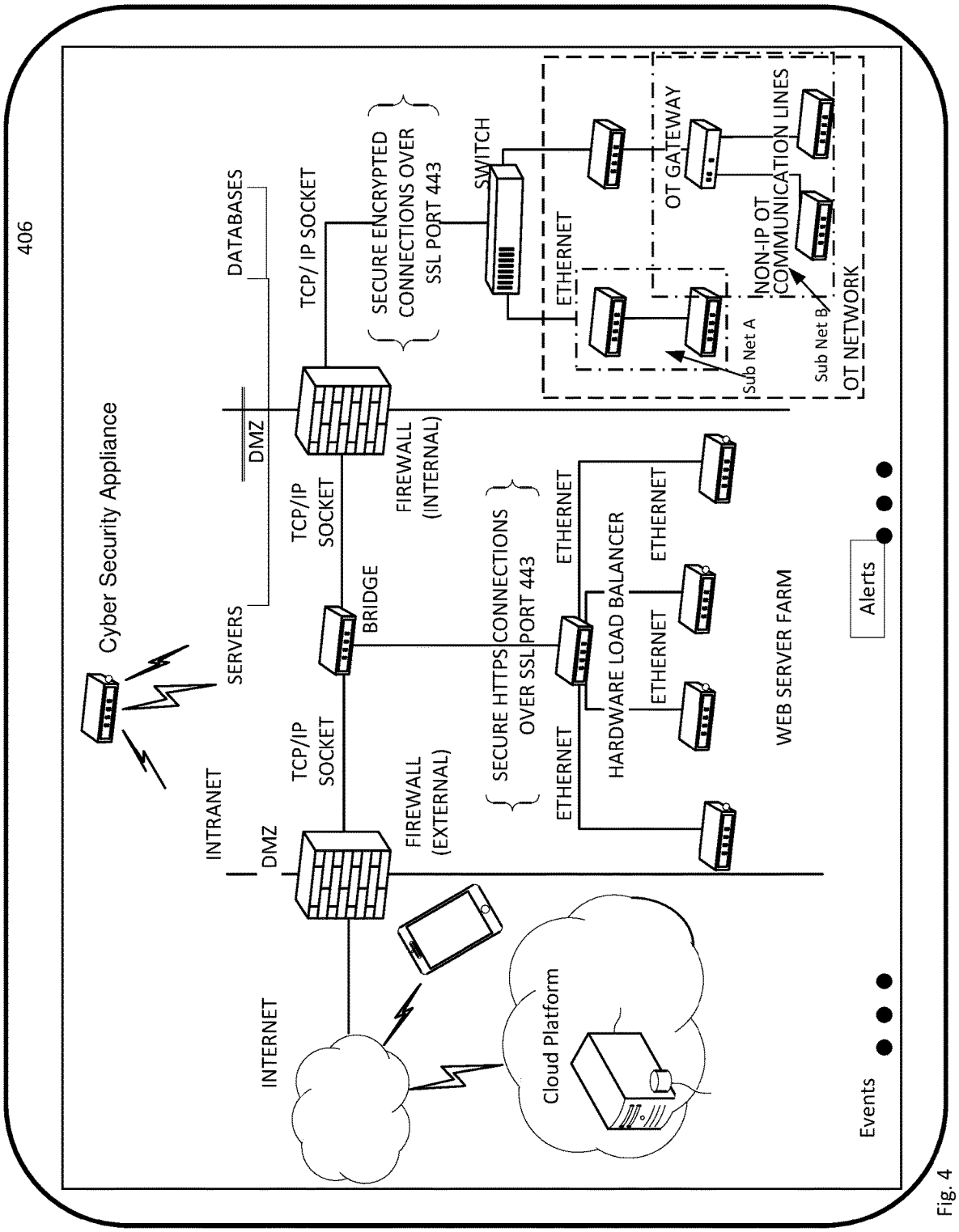

FIG. 4 illustrates a block diagram of an embodiment of an example network with i) network devices, ii) network addresses, and iii) any combination of both, which either 1) can receive or 2) cannot receive protocol communications from a location of a host for the cyber-security response-orchestrator engine.

Figure 5:
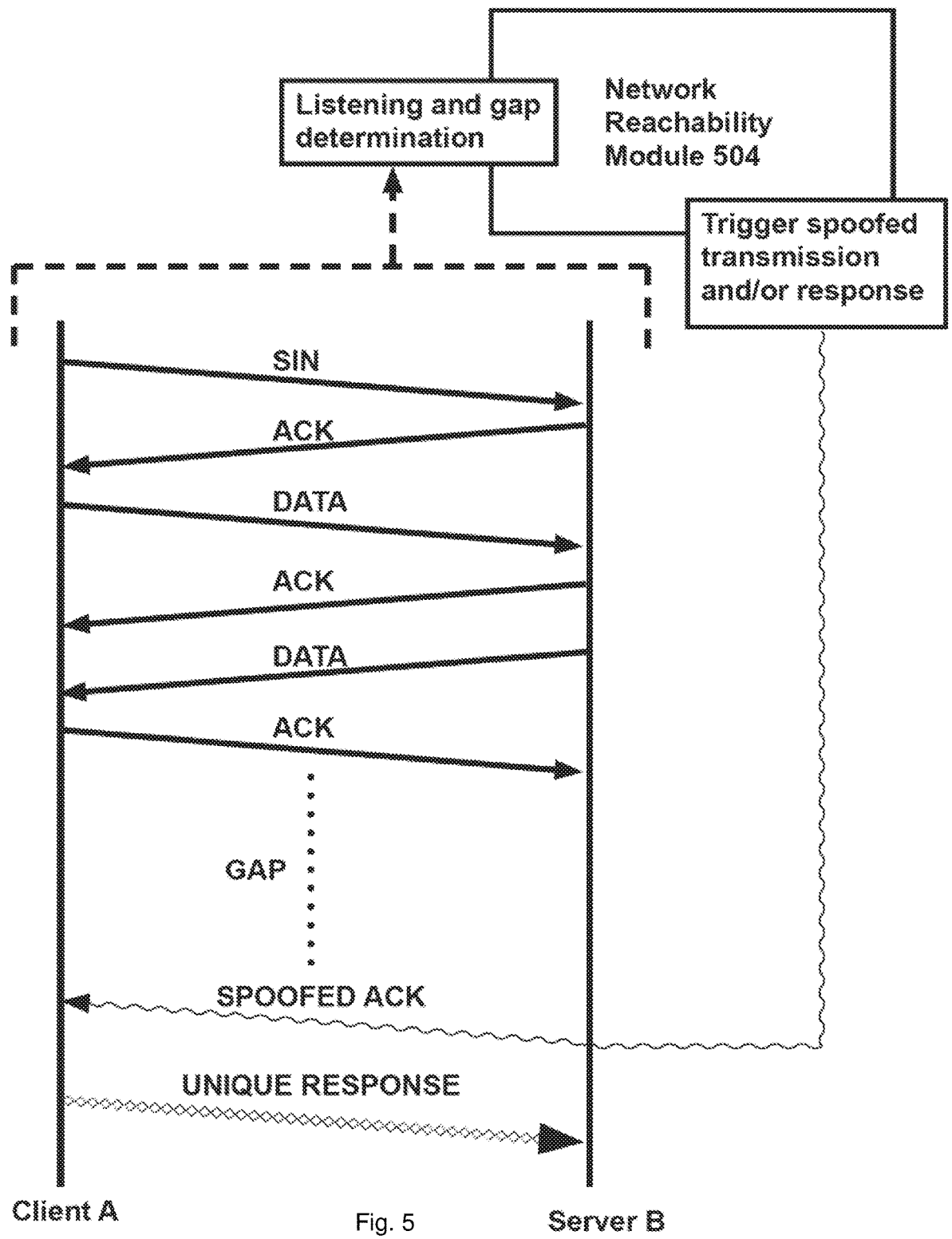

FIG. 5 illustrates a block diagram of an embodiment of a network reachability module configured to autonomously map and track network reachability while minimizing negative effects on legitimate network traffic.

Figure 6:
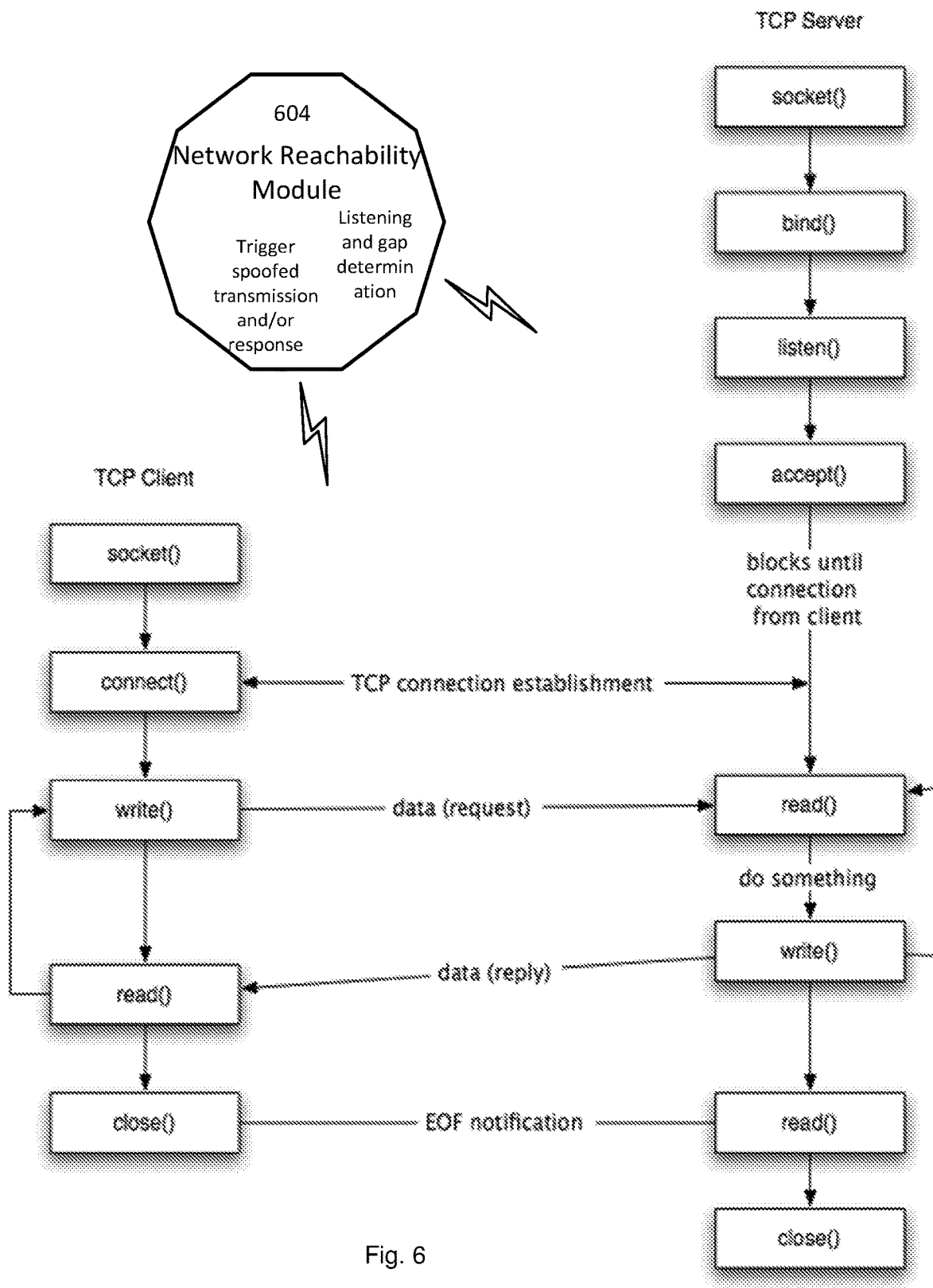

FIG. 6 illustrates a block diagram of an embodiment of the gap determination module to determine when a gap of time is found to communicate to the trigger module to send the generated spoofed transmission and/or response communication, which is addressed to go to the target address, via the established connection, in order to check if a successful protocol communication could be reached from the cyber-security response-orchestrator engine to the second device at the target network address.

Figure 7:
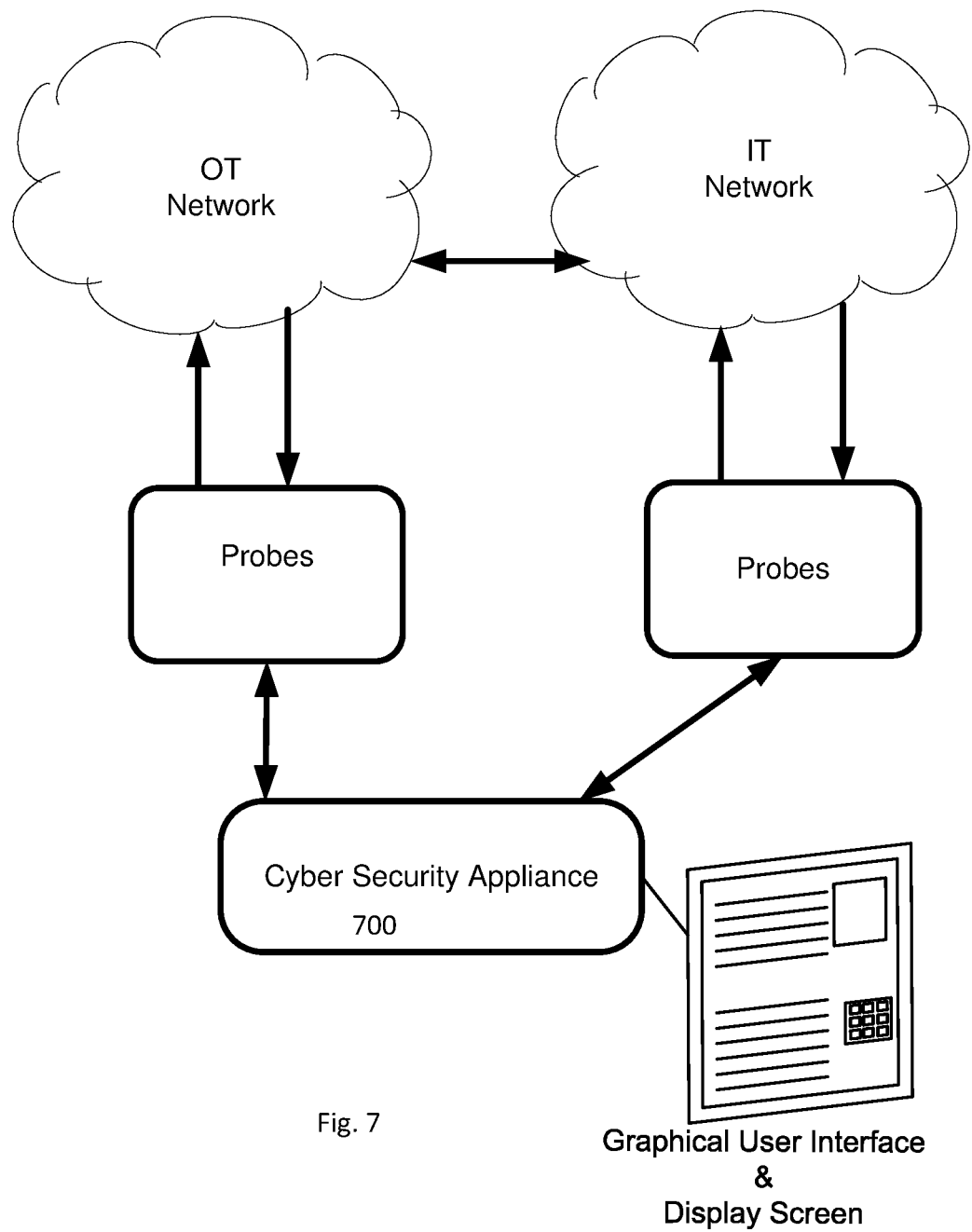

FIG. 7 illustrates a block diagram of an embodiment of the cyber security appliance with a user interface module to generate categories of subnets that appear on a map of network reachability that 1) can receive and 2) that cannot receive protocol communications from the location of the host for the cyber-security response-orchestrator engine.

Figure 8:
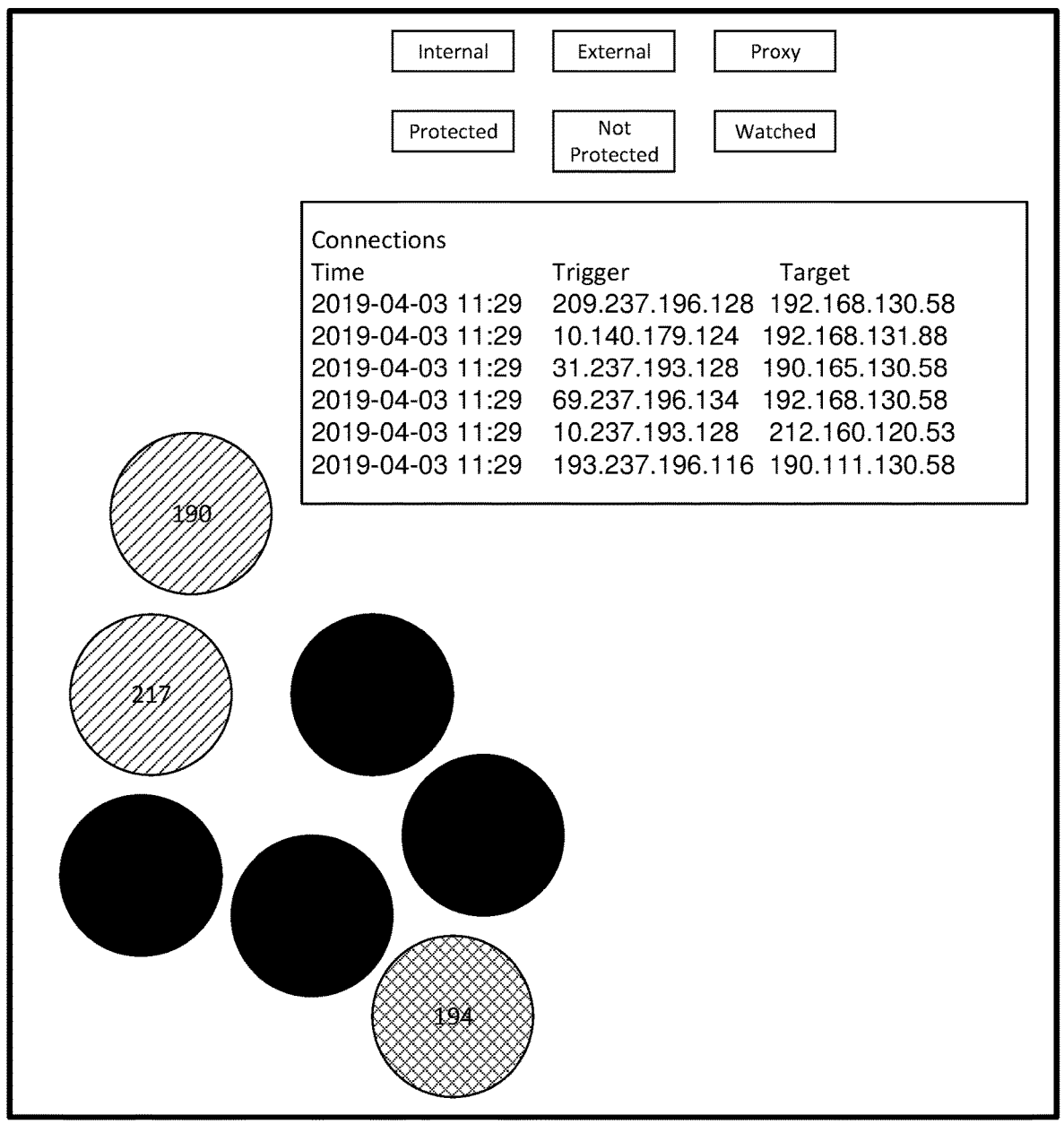

FIG. 8 illustrates a block diagram of an embodiment of a user interface module to generate multiple categories of subnets that appear on the map of network reachability on a display screen.

Figure 9:
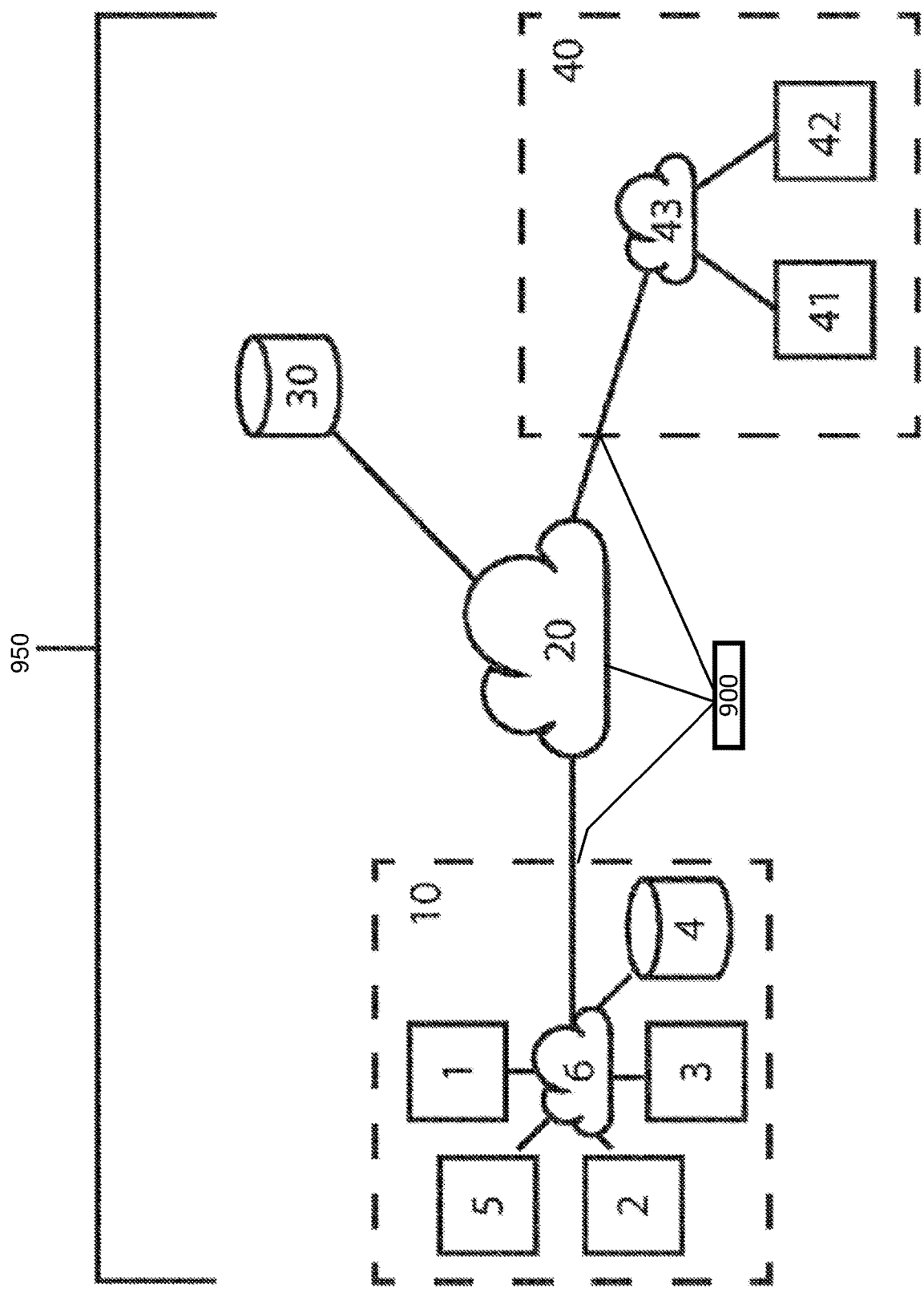

FIG. 9 illustrates a block diagram of an embodiment of an example cyber security appliance using a network reachability module mapping and tracking network reachability in an example network.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, an Internet Protocol address (network address) can be a number assigned to the connection in a network. IP addresses are assigned typically (by an ISP) when the device connects to the network. The basic difference between a MAC address and an IP address is that a MAC address uniquely identifies a device that wants to take part in a network. On the other hand, an IP address uniquely defines a connection of a network with an interface of a device. For ease, in this application herein a 'network address' can be defined as either an IP address or a MAC address. In addition, different parts of a network can be logically subdivided into subnets, where typically each different branch of the network with its own router is its own subnet. Also, many different protocols, such as Internet Protocol, TCP, UDP, HTTP, and FTP as well as wireless network protocols, such as Wi-Fi, Bluetooth, and LTE, can all fall under a general category of a 'network protocol.' What all these network protocols share in common is that a formal set of standards and policies comprised of rules, procedures and formats define communication between two or more devices over a network. Network protocols govern the end-to-end processes of timely, secure and managed data or network communication. These network policies define the types of communication packets that can be utilized as well as how the expected exchange of communications will occur between two devices on a network. A network reachability module can be configured to understand the formal set of standards and policies defining transmission and response communications between two or more devices over that network to implement the concepts herein. Transmission Control Protocol (TCP) will be used as an example network protocol implementing an example of the concepts described herein for the network addresses and subnets.

Note, the target address maybe either a traditional source address, a traditional destination address, or even an address in between, such as a proxy address, because a trigger module within the network reachability module can generate a spoofed transmission and/or a response packet in the communication stream between a source device in a first subnet and a destination device in a second subnet. The trigger module can imitate the sending device's network address by spoofing in the trigger address into the spoofed transmission and/or a response packet, which is being sent to the target address, which would be receiving the spoofed transmission and/or a response packet.

In general, a network reachability module maps and dynamically tracks network reachability of network addresses and/or devices. The network reachability module 1) monitors network traffic and 2) keeps a list of known devices and/or known subnets on the network, which is dynamically tracked and updated as previously unknown devices and subnets on the network are detected.

The network reachability module generates a spoofed transmission and/or response communication, supported by a network protocol used by the network to map network reachability of i) network devices, ii) network addresses, and iii) any combination of both, which either 1) can receive or 2) cannot receive protocol communications from a location of a host for the network reachability module in the network. The network reachability module looks for an opportune time to generate the spoofed communication and then periodically rechecks network reachability for each network device and network address.

Figure 1:
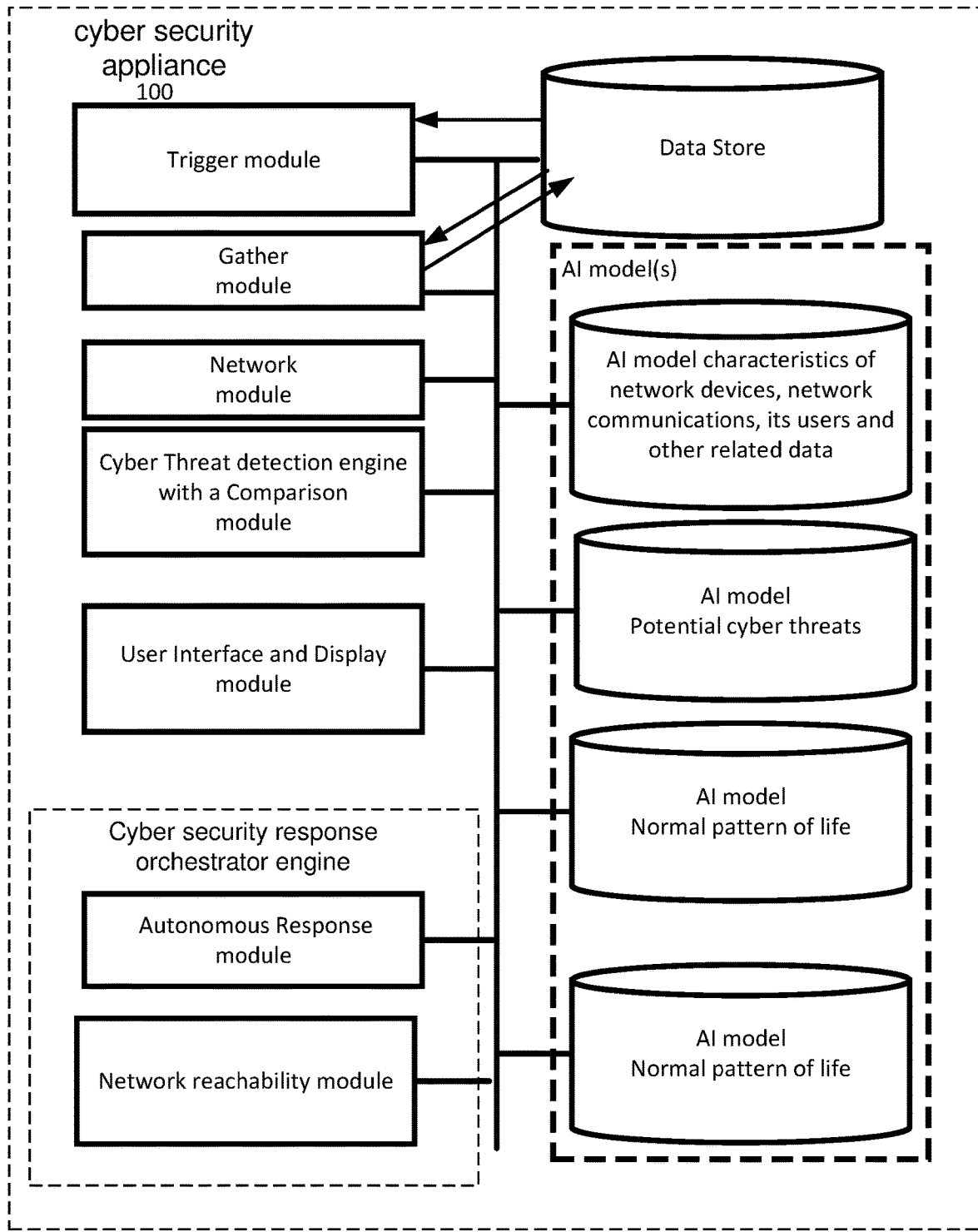
FIG. 1 illustrates a block diagram of an embodiment of a cyber security appliance configured to detect cyber security threats with one or more Artificial Intelligence (AI) models as well as then autonomously take one or more actions to mitigate that cyber security threat.

FIG. 1 illustrates a block diagram of an embodiment of a cyber security appliance configured to detect cyber security threats with one or more Artificial Intelligence (AI) models as well as then autonomously take one or more actions to mitigate that cyber security threat.

The cyber security appliance 100 may include a trigger module, a data gather module, a network module, a cyber threat detection engine with a comparison module, a user interface and display module, a cyber-security response-orchestrator engine with an autonomous response module and a network reachability module data store, and a set of AI models.

At the point of packet ingestion on the cyber security appliance 100, network traffic packets are distributed to various processing and analysis modules.

A trigger module may detect time stamped data indicating one or more i) events and/or ii) alerts from I) unusual or II) suspicious behavior/activity are occurring and then triggers that something unusual is happening. The gather module cooperates with the trigger module. Accordingly, the gather module is triggered by specific events and/or alerts of anomalies such as i) an abnormal behavior, ii) a suspicious activity, and iii) any combination of both. The inline data may be gathered on the deployment from a data store when the traffic is observed. The scope and wide variation of data available in the data store results in good quality data for analysis. The collected data is passed to the various modules as well as to the data store.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation occurs between the gather module, the network module monitoring network activity, the comparison module to apply one or more models trained on different aspects of this process, and the cyber threat module to identify cyber threats based on comparisons by the comparison module. Each hypothesis of typical cyber threats can have various supporting points of data and other metrics associated with that possible threat, such as a human user insider attack, inappropriate network behavior, inappropriate behavior in the OT network, inappropriate cloud behavior, etc. from a human user. The hypothesis of typical cyber threats to be supported or refuted also includes a malicious software or malware attack that causes inappropriate informational technology behavior, etc. A machine-learning algorithm will look at the relevant points of data to support or refute that particular hypothesis of what the suspicious activity or abnormal behavior related for each hypothesis on what the suspicious activity or abnormal behavior relates to.

Networks have a wealth of data and metrics that may be collected. The gatherer modules may then filter or condense the mass of data down into the important or salient features of data. In an embodiment, the informational technology module, the OT module, the comparison module, the coordinator module, the cyber threat module can be combined or kept as separate modules.

The network module can receive data on the network from i) a set of probes, ii) by passive traffic ingestion through a location within the network, and iii) any combination of both. The network module can reference various machine-learning models. The network module can reference one or more machine-learning models, using machine-learning and AI algorithms, that are trained on a normal pattern of life of users of the network module. The network module can also reference one or more machine-learning models, using machine-learning and AI algorithms, that are trained on a normal pattern of life of devices in the network module. The network module can also reference one or more machine-learning models, using machine-learning and AI algorithms, that are trained on a normal pattern of life of network environment specific entities and the detailed process control and protocol communications between them.

A comparator module can compare the received data on the network to the normal pattern of life of any of the users, devices, and other network characteristics, e.g. protocols, etc., to detect anomalies in the normal pattern of life for these entities in order to detect a cyber threat.

Note, once the normal pattern of life has been learned by the models, then the network module and/or comparator module can readily identify the anomalies in the normal pattern of life; and thus, unusual behaviors from the devices, users, or controllers of the network. The network module can reference these one or more machine-learning models that are trained on a normal behavior of at least one or more entities associated with the informational technology network; and thus, be able to indicate when a behavior of the given entity falls outside of being a normal pattern of life.

Note, once the normal pattern of life has been learned by the models, then the network module and/or comparator module can readily identify the anomalies in the normal pattern of life; and thus, unusual behaviors from the devices, users, or controllers of the network.

A network module, via referencing the AI machine-learning models, can analyze and integrate activities occurring in the network when analyzing the detected anomalies in the normal pattern of life in order to detect the cyber threat.

A GUI can display metrics, alerts, and events of the network in light of activities occurring in the network on a common display screen.

The GUI also allows a viewer to then confirm the detected cyber threat in view of what is happening in the network. Visibility over the network in this manner can be advantageous even when a cyber threat is not detected, as malfunctions or misconfigurations in the production process can be viewed in the same manner.

A cyber threat module can compare a chain of one or more of the detected anomalies by referencing one or more machine-learning models trained on, at least, the cyber threat. (See FIG. 2 for example) Multiple machine-learning models may be trained, each model trained on a category of cyber threats and its corresponding members and the characteristics of those cyber threats. Alternatively, each model trained on its own specific cyber threat. The cyber threat module cooperates and communicates with the other modules. The cyber threat module can use one or more AI algorithms to assess whether the anomalous network activity has previously appeared in other published threat research or known lists of malicious files or Internet addresses. The multiple machine-learning models can be augmented by consulting internal threat databases or external public sources of threat data.

The cyber security appliance 100 can then take actions in response to counter detected potential cyber threats. The autonomous response module, rather than a human taking an action, can be configured to cause one or more rapid autonomous actions in response to be taken to counter the cyber threat.

A user interface for the response module can program the autonomous response module i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response module will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response module uses one or more Artificial Intelligence models that are configured to intelligently work with other third party defense systems in that customer's network against threats. The autonomous response module can send its own protocol commands to devices and/or take actions on its own. In addition, the autonomous response module uses the one or more Artificial Intelligence models to orchestrate with other third party defense systems to create a unified defense response against a detected threat within or external to that customer's network. The autonomous response module can be an autonomous self-learning digital response coordinator that is trained specifically to control and reconfigure the actions of traditional legacy computer defenses (e.g. firewalls, switches, proxy servers, etc.) to contain threats propagated by, or enabled by, networks and the internet.

The cyber threat module can cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

Again, a set of AI models may be trained on and continually update characteristics of network devices, network communications, its users and other related data. Another set of AI models may be trained on and continually update characteristics of potential cyber threats. Yet another set of AI models may be trained on and continually updated on potential actions to take to mitigate a detected cyber threat and present default actions as well as configurable autonomous actions to take to a user, who may set the autonomous actions that the autonomous response module may take on its own initiative.

The cyber security appliance 100 may be hosted on a computing device, on one or more servers, or in its own cyber threat appliance platform.

A cyber-security response-orchestrator engine (e.g. Antigena Network) can be an 'orchestrator' of autonomous reactive responses to cyber threats. The cyber-security response-orchestrator engine is configurable to take autonomous actions to mitigate a detected cyber threat, without needing a human to initiate that action, in order to take the autonomous actions when the cyber threat is detected. The cyber-security response-orchestrator engine can take autonomous actions to send commands to other cyber protection components, such as a firewall component or an antivirus component. The cyber-security response-orchestrator engine can orchestrate cutting off network connections between network devices. The network reachability module provides that cyber-security response-orchestrator engine with an awareness of where it can reach through a specific control method, so the cyber-security response-orchestrator engine will not attempt an unsuccessful control method when a cyber threat is detected. Instead, the cyber-security response-orchestrator engine will take a different approach such as a firewall approach. Note, access and control of a network is usually seen from an entry/exit point of view (firewalls) to that network or endpoint view (antivirus), rather than controlling access within a network between devices as well as from an entry/exit point of the network with a cyber-security response-orchestrator engine. The cyber-security response-orchestrator engine may orchestrate cutting off network connections between network devices from a central location within the network.

The network reachability module may be an independent module to map network reachability.

The network reachability module can also be a module within a cyber-security response-orchestrator engine (e.g. Antigena Network). The network reachability module can use spoofed transmission and/or response communications supported by a network protocol, such as ACK packets in the TCP/IP protocol, to map at least network addresses of target address and trigger address locations for network connections and network reachability as well as subsequently generate a visual map of network reachability. The visual map of network reachability may identify all subnet locations on a network that can and cannot receive spoofed packets via a protocol from one or more locations that host a cyber-security response-orchestrator engine.

Figure 2:
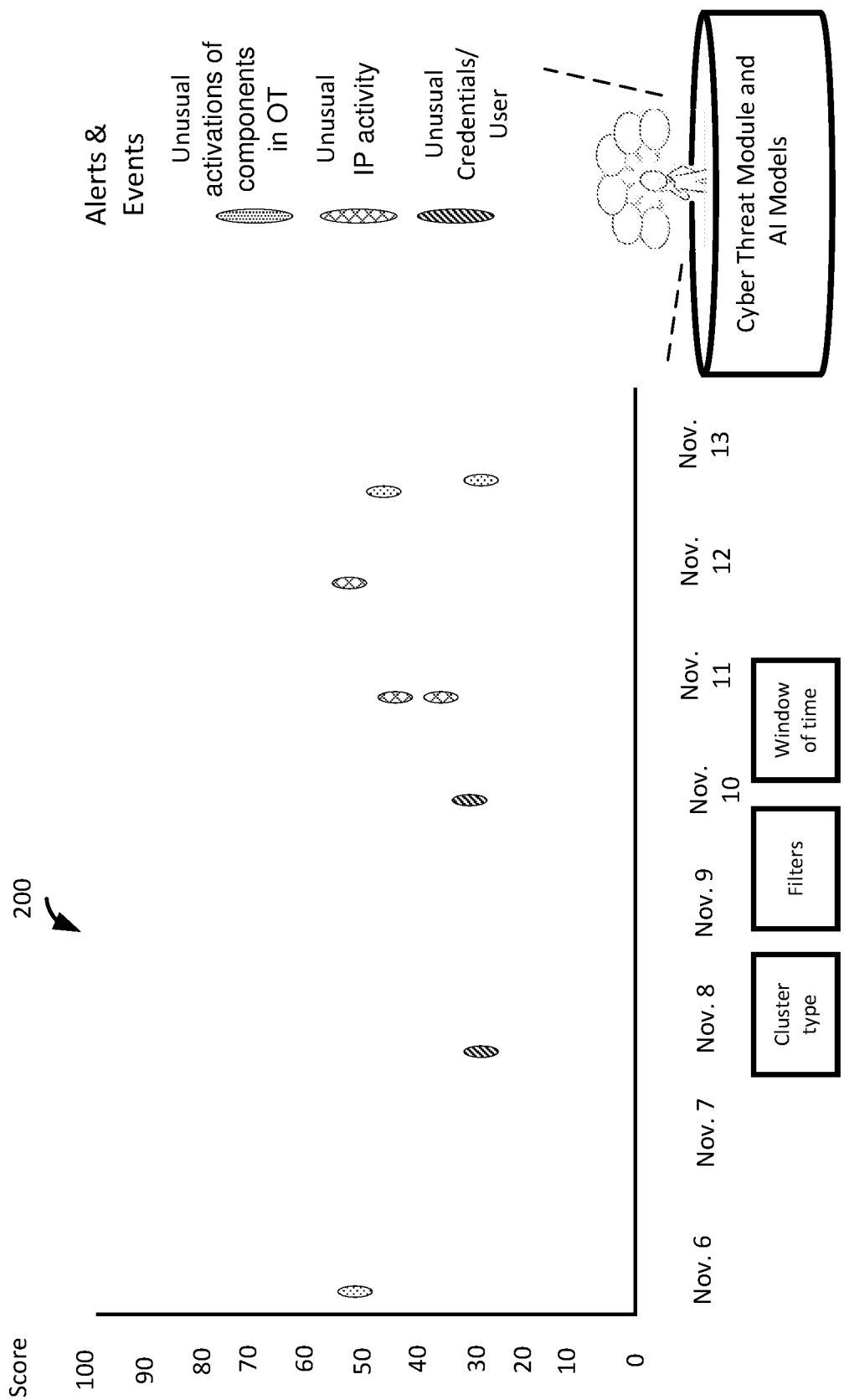
FIG. 2 illustrates a diagram of an embodiment of user interface showing a cluster of alerts and/or events from the unusual pattern of behaviors and a label of what the similar characteristics are.

FIG. 2 illustrates a diagram of an embodiment of user interface showing a cluster of alerts and/or events from the unusual pattern of behaviors and a label of what the similar characteristics are. The graph 200 shows a cluster of unusual behaviors of the network device activity and user activity.

The cyber-threat module determines a threat risk parameter that factors in how the chain of unusual behaviors correlate to potential cyber threats and 'the likelihood that this chain of one or more unusual behaviors of the network device activity and user activity under analysis fall outside of derived normal benign behavior;' and thus, is malicious behavior.

The cyber-threat module uses the AI models to piece together the unusual behaviors to see if those behaviors correlate to behaviors known from other cyber threats.

FIG. 3 illustrates a block diagram of an embodiment of the network reachability module to combine i) the tracking module's monitoring of network traffic and keeping the list of known devices and/or known subnets on the network, with ii) the trigger module's autonomous periodic generation of the spoofed transmission and/or response communication to check whether if at least one network address in each subnet, for each of the known subnets, can be reached.

The network reachability module 304 can be composed of multiple smaller modules including a trigger module, a data gather module, a data store, a tracking module, a comparison module, a gap determination module, a troubleshooting and rollout module, a network reachability module 304 portion on the user interface module, and other similar modules.

The network reachability module 304 maps and dynamically tracks network reachability of a cyber-security response-orchestrator engine. Again, the cyber-security response-orchestrator engine is configurable by a user to take autonomous actions, without a human to initiate the actions, to mitigate a detected cyber threat.

The tracking module 1) monitors network traffic and 2) keeps a list of known devices and/or known subnets on the network. The list of known devices and/or known subnets on the network is dynamically tracked and updated as previously unknown devices and subnets on the network are detected by the tracking module.

The trigger module generates spoofed transmissions and/or response communications, supported by a network protocol used by the network, that are used to map network reachability of i) network devices, ii) network addresses, and iii) any combination of both, which either 1) can receive or 2) cannot receive protocol communications from a location of a host for the cyber-security response-orchestrator engine.

The trigger module and the tracking module can cooperate to repeatedly, on their own initiative, go through and check network addresses to see if at least one network device in each known subnet can be reached, via the generated spoofed transmission and/or response communication, and then periodically recheck the network addresses with network devices in each known subnet over time. The network reachability module 304 can combine i) the tracking module's monitoring of network traffic and keeping the list of known devices and/or known subnets on the network, with ii) the trigger module's autonomous periodic generation of the spoofed transmission and/or response communication to check whether if at least one network address in each subnet, for each of the known subnets, can be reached. Note, the combination in the troubleshooting and rollout module essentially automates a rollout process for the cyber-security response-orchestrator engine.

The trigger module deliberately generates any of i) the spoofed transmission communication or ii) the response communication with falsified identity information to imitate a network address of a device sending legitimate communications to another device on the network. The trigger module deliberately generates the spoofed transmission or the response communication to also have some information or some characteristic that makes a reply by the target device on the network to this spoofed communication uniquely identifiable from any legitimate communications between these two devices. The tracking module identifies a subsequent communication in a stream of communications between these two devices that specifically corresponds back to the generated spoofed transmission communication or the generated spoofed response communication.

The trigger address, created by the spoofing transmission packet or response packet generator, is substituted into the spoofed message to imitate one of the devices in its subnets in which the network connection has been established. The target address is the device in its subnet being sent the spoofed transmission or response packet.

In an example, the trigger module generates the spoofed response communication in a form of an acknowledge packet (ACK) with falsified identity information to imitate a network address of the sending device sending legitimate communications back to the target device on the network. In this example, the acknowledge packet can be generated with the information and/or characteristic that makes the reply from the target device to the spoofed acknowledge packet uniquely identifiable when a subsequent communication is sent by the target device on the network. For example, if data is being transferred, an acknowledge signal can be sent with a sequence number quite out the range of what would be a legitimate number in the data sequence. The subsequent response from the target device, directly referencing the sequence number or indicating that the sequence number received was in error, then the tracking module will be able to confirm the original ACK packet was actually received by the target device.

The tracking module determines when a connection has been established for legitimate communications between a first network device in its subnet and a second device at a target address.

The gap determination module determines when a gap of time is found to communicate to the trigger module to send the generated spoofed transmission and/or response communication, which is addressed to go the target address, via the established connection, in order to check if a successful protocol communication could be reached from the cyber-security response-orchestrator engine to the second device at the target network address.

The cyber-security response-orchestrator engine, via the autonomous response module, is configured to carry out, as at least one of the autonomous actions that the cyber-security response-orchestrator engine can take, to orchestrate cutting off network connections between the first network device and the second device when the cyber threat is detected.

A user interface module cooperates with a data store to display various information. The data store for the network reachability module 304 works with the other modules to store information. The data store stores various information associated with network reachability. For example, the data store stores the network reachability of i) network devices, ii) network addresses, and iii) any combination of both, which 1) can receive or 2) cannot receive protocol communications from a location of a host for the cyber-security response-orchestrator engine, in order to generate a graphical map of network addresses that 1) can receive or 2) cannot receive protocol communications from the location of the host for the cyber-security response-orchestrator engine. The user interface module generates multiple categories of subnets that appear on the map of network reachability on a display screen. The multiple categories of subnets graphically represented on the display screen include at least a first category of subnets that 1) can receive and 2) a second category of subnets that cannot receive protocol communications from the location of the host for the cyber-security response-orchestrator engine. This allows a human viewing the displayed map to rapidly comprehend what can and cannot be reached from the location of the cyber security appliance.

Thus, the user interface module displays one or more generated maps of reachability, listing of reachable connections and not reachable connections on the display screen.

The data store may also store, for example, information such as trigger/source addresses, target/destination addresses for each network device in its subnet; network connections, including ports and/or sockets used, and number of hops between target address and trigger address destinations; average gap duration between sending different types of protocol communications and their corresponding responses from the target destination; average connection duration; a list of reachable connections, not reachable connections, which is periodically updated, etc.

The trigger module and the tracking module further cooperate. The tracking module can track a time of day and a traversal path of the spoofed communication as well as a number of times that the generated spoofed protocol communication could not be received from a location of a host for the cyber-security response-orchestrator engine. The trigger module is configured with intelligence to vary any of i) the time of day and ii) the traversal path of the generated spoofed communication when the number of times that previous generated spoofed protocol communications could not be received at that time of day or via that traversal path exceeds a threshold amount.

The network reachability module 304 can supply information concerning the reachability of a first device on a first subnet mapped by the network reachability module 304 to the cyber-security response-orchestrator engine in order facilitate the cyber-security response-orchestrator engine to select a possible autonomous action when the first device in the network is exhibiting malicious behavior, where the possible autonomous action includes when the cyber-security response-orchestrator engine cannot reach a target device in its subnet via a protocol communication, then the cyber-security response-orchestrator engine must use an alternative approach, and not attempt to generate a direct protocol communication to the target device in its subnet, in order to mitigate the detected cyber threat.

The gap determination module can cooperate with the trigger module. The gap determination module determines whether a connection is open between a first device and the target device. The gap determination module can examine i) a type of protocol communication occurring between a first device sending a protocol communication and a target device receiving the protocol communication, and ii) whether 1) legitimate communications are currently in flight in the traversal path between the first device and the second device or 2) a gap of time is currently happening in an exchange of protocol communications. The gap determination module can notify the trigger module an opportunity exists to send the generated spoofed protocol communication when the connection is open between the first device and the target device and when the gap of time, above a threshold amount, is currently happening in the exchange of protocol communications between the first device and the target device.

The gap determination module dynamically determines the threshold amount of time for the gap determination based on at least a) the number of hops away between a source address and a target address for the first device and the second device or b) previously successful timeframes for spoofed transmissions for the given protocol and the given network. The gap determination module generates the trigger during the gap in communication so as to not interfere with or disrupt the legitimate communications between the first and second device when mapping out and then periodically updating network reachability for the cyber-security response-orchestrator engine.

Again, the tracking module can perform a number of functions including how many attempts have been made to reach each network device in all of the subnets via TCP connections, protocol used between the each network device, traversal path/routes, including ports and/or sockets, hops, etc. used to successfully and/or not successfully reach each network device in its subnet via TCP connections, and being responsible to log into the data store various information including whether each network device in its subnet via TCP connections can be or cannot be successfully reached via TCP connections, as well as all of its tracking data.

Note, the User Interface module, includes displaying one or more generated maps of reachability, listing of reachable connections, not reachable connections, etc. When the cyber-security response-orchestrator engine displays this information, then it gives customers some visibility on how fully they are being protected. The display of this information gives a human operator confirmation that their network is protected by the autonomous response module. The user interface also displays where (e.g. locations—sub nets) in their network is unprotected and requires further configuration.

FIG. 4 illustrates a block diagram of an embodiment of an example network with i) network devices, ii) network addresses, and iii) any combination of both, which either 1) can receive or 2) cannot receive protocol communications from a location of a host for the cyber-security response-orchestrator engine.

The cyber security appliance may monitor one or more networks. For example, an informational technology network 406 may have a firewall separating the internal network and its network devices from an external network of the Internet, cloud platforms, and external devices such as a smart phone, server, laptop, etc., accessing the network 406 through the firewall. Within the network 406, lots of subnets will be formed within that network 406 each separated by a routing device sending network traffic down different pathways and branches within the network. For example, a first subnet A may be a first branch off of a switch in the network 406 and with a first and a second device on that subnet A. A second subnet B may be a second branch off of the switch with devices of a gateway feeding two routers into an operational technology network with its devices on those network addresses. In this example, the operational technology network and the informational technology network form the network 406.

The reachability of a device on a subnet is mapped by the network reachability module and its resultant mapping is used by the cyber-security response-orchestrator engine to select a possible action when a device is exhibiting malicious behavior. The possible actions can include if the orchestrator cannot reach the device in that subnet via TCP connections, the cyber-security response-orchestrator engine must use an alternative approach. The traversal path of the mapping packets is used to automatically create and regularly update custom routes that any reset packets must follow to end a potentially malicious communication originating from or being received by a device in the network 406.

FIG. 5 illustrates a block diagram of an embodiment of a network reachability module configured to autonomously map and track network reachability while minimizing negative effects on legitimate network traffic.

When two computing devices talk to each other across a network they use a standard protocol and connections, such as a TCP/IP protocol, and then exchange communications with each other.

The network reachability module 504 autonomously maps and tracks network reachability by listening to these communication exchanges and generating spoofed communications while minimizing negative effects on legitimate network traffic.

Note, TCP also uses a sequence to establish a connection and acknowledgments with positional numbers to keep track of data in the transit between two-end host computing devices.

Typical TCP communications between a client (in this case the network device sending a transmission communication across a network) and a server (in this case the network device receiving the transmission communication across the network and will subsequently generate a response communication). The network reachability module 504 may listen to and determine gaps in network traffic communications between these two computing devices. A client can generate a Syn packet conveying "Hello" and in response the server sends out a Syn Ack packet saying "Hello I received your Syn packet," to establish a connection between these two computing devices. The client can then send some data packets and, for each data packet sent, the server will send back an ACK packet acknowledging that particular data packet was received on the server side. Like several protocols, TCP uses acknowledgments to acknowledge a packet has been successfully received by a target device. If the server detects that a packet from the client is dropped or a big gap in between an expected sequence of data packet, the server will send a duplicate acknowledge packet for the first lot of packets received. The client upon receiving the duplicate acknowledge packet will know the server received the first lot of data packets sent. If the server sends back a duplicate acknowledge packet with completely the wrong acknowledgement numbers associated with the first set of data packets, then the server will send back a duplicate acknowledge packet communication conveying something was wrong. The duplicate acknowledge packet communication could convey something such as "I already received this set of packets" or if a big gap exists between the numbering of the data packets expected to be seen and the last set of data packets being received, a communication will be sent to the client that some of the data packets may need to be resent because this gap exists, indicating some of the packets may have been dropped. The examples above are merely examples of many ways of creating a spoofed packet with a uniquely identifiable response to the created spoof packet.

Based on listening to this exchange of communications, the network reachability module 504 generates a spoofed transmission and/or response with unique identifiable information when referenced in a subsequent response from a target device. The network reachability module 504 also listens for a gap of time between these communications to trigger a sending of a spoofed transmission and/or response from the cyber security appliance to determine if the cyber security appliance could communicate successfully with one of these computing devices. The network reachability module 504 will also listen for a gap of time to send a generated spoofed transmission and/or response to determine if the cyber security appliance could communicate successfully with the other device of these computing devices.

A spoofing protocol generator in the trigger module is coded to know of and be aware of multiple opportunities in various protocol communications to look for what should have a big enough gap of time between opening and closing the connection to generate a spoofed transmission and/or response.

In addition, the spoofing protocol generator in the trigger module maintains information on example ways to generate a spoofed transmission and/or response with a subsequent uniquely identifiable response as part of the protocol communication scheme itself. The spoofing protocol generator in the trigger module maintains at least one or more protocol standards and how communications occur.

FIG. 6 illustrates a block diagram of an embodiment of the gap determination module to determine when a gap of time is found to communicate to the trigger module to send the generated spoofed transmission and/or response communication, which is addressed to go to the target address, via the established connection, in order to check if a successful protocol communication could be reached from the cyber-security response-orchestrator engine to the second device at the target network address.

Again, an example exchange of traffic between a client and a server is shown with the network reachability module 604 monitoring and understanding conversations. The client establishes a connection with the server to request data.

At the point of packet ingestion on the cyber security appliance, packets are distributed to various processing and analysis modules. The network reachability module 604 in the cyber-security response-orchestrator engine accepts packets (or at least the data and meta data determined about these packets) as part of this allocation process and, in an example, attempts to identify a long-lived connection (where data is transferred for a reasonable amount of time such as 5 seconds or more) between device A in one subnet and device B in another subnet. The trigger module is configured to determine when, such as when a connection is established between two devices to request and reply with packets full of data occurs, to generate the spoofed transmission and/or response. The trigger module in the network reachability module 604 then waits for a gap in exchanges of communications in that connection—for example, in an SSH Connection commands may not be sent for a period of time but the connection is kept alive. A gap determination module is configured to dynamically determine an average gap between the transmission and response time cycle. In an example, at least a one second gap of time duration is needed between the sending and response cycle, with a variance based on a number of hops away between source address and target address. During the gap in exchanges of communications, the network reachability module 604 sends a generated spoofing communication, such as an ACK packet, to, for example, device B, pretending to originate from device A (spoofed). Next, if a mirrored ACK packet or otherwise uniquely corresponding response to the spoofing packet is sent back from device B, then that means the cyber-security response-orchestrator engine in the cyber security appliance can access that network device (and therefore the device subnet) and will be able to perform a threat response act, such as a RST on that network device in its subnet. A trigger module is configured to generate spoofed transmissions and/or responses for each network device in its subnet. Subsequently, the traffic monitor module is configured to observe network traffic for the transmission and/or response uniquely corresponding to the spoofing packet back from the target device in its subnet. In addition, the same process is repeated for reverse situation of device in its subnet A spoofing device in its subnet B. If not successful, the trigger module working with the tracking module can vary its starting time and/or route path to try to get a mirrored ACK packet or otherwise uniquely corresponding response to the spoofing packet back from the target device in its subnet.

The network reachability module 604 will attempt to map all subnets in the network through this method, identifying a subnet-to-subnet connection and then sending an ACK during a gap in the connection. If the cyber-security response-orchestrator engine is configured to perform threat response acts, such as sending an Antigena Reset packet, from more than one interface, then the ACK will be sent from all configured firing interfaces iteratively. In a complex network where the cyber security appliance may be operating probes (or virtual probes) as well as master appliances, probes close to the subnets will also attempt to perform the ACK. For each subnet, the network reachability module 604 will attempt an ACK from three locations: internal, external, and proxy. If a connection between an external (internet) IP is seen, the network reachability module will attempt the ACK from the spoofed external IP. If a proxy is seen, the network reachability module 604 will attempt to spoof an ACK from the proxy and finally, an internal location (subnet-to-subnet) as described above. The final result of this ongoing method is a reachability map of the network that outlines protected subnets. (i.e., those subnets the cyber-security response-orchestrator engine can reach with a TCP reset packet) and unprotected subnets (those that did not respond appropriately to the ACK) that would require an alternative defence mechanism.

The network reachability module 604 is configured to identify a list of generally long-lived protocols with frequent communication gaps (i.e. SSH) and give those communications a preferential weighting for spoofing. The network reachability module may also determine protocols observed on the network that provide the best conditions for spoofed transmissions, whether by the length of connection or the frequency of inactivity with an open connection, and give preference to spoofing these protocols within the given network.

This reachability mapped by the network reachability module 604 of the cyber security response orchestrator identifies where/what network addresses on the network can be reached by a packet originating from the cyber security appliance, without filling the network with spoofed traffic and interrupting business processes. The spoofing packet used for mapping has to have a minimum (e.g. no) impact on normal communications. For example, a spoofing packet could be an ACK packet as this packet actually has no impact on the legitimate normal communications; whereas, a RST packet (reset command) would cut out connections between the devices, which does make an impact on these normal communications. The spoofing packet, such as ACK packets, are essentially neutral, but must be sent at the exact right time to receive any of 1) a mirrored response, or 2) otherwise a uniquely identifiable response from a stream of legitimate communications between the target and trigger addresses. A trigger module in the network reachability module 604 cooperates with the data store and other modules to identify suitable connections where these conditions can be met. The trigger module working with the tracking module and a data store in the network reachability module 604 attempt to identify a long-lived connection (where data is transferred for a reasonable amount of time) between device A in one subnet and device B in another subnet. By long-lived connection, this patent application means TCP connections that are opened once and then used for at least 5 seconds before terminating the TCP connection. Thus, a long lived connection must remain open for at least 5 seconds in this context before starting the closing of that connection.

The network reachability module 604 dynamically/intelligently selects the connections to imitate (spoof) in order to perform the reachability test and may refine its selection of suitable TCP connections and repeat the mapping at a regular time interval (but at varied starting times). The trigger module deliberately generates any of a transmission communication or a response communication with falsified ID information to imitate the trigger address of the device sending the communication.

Usually the generated spoofed transmission or response communication will also have some information or characteristic that makes this spoofed communication uniquely identifiable from the legitimate communications between the sending device associated with the trigger address and the receiving device associated with the target address so the tracking module can identify a subsequent communication in the stream of communications that specifically corresponds back to this spoofed transmission and/or response communication. The subsequent communication in the stream of communications will be a particular type of expected packet. For example, the trigger module may send out DSACK transmissions as the spoofed TCP packets. The trigger module can send out a DSACK transmission and the traffic monitor module may monitor for one or more responses to the DSACK transmission in the network traffic flow from an end computing device in order to test/verify that an end computing device is in fact accessible. The trigger module and tracking module are configured to cooperate to repeatedly go through and check all network addresses to see if these network addresses can be reached, via the spoofed packet, and then periodically recheck each of these network addresses over time. The spoofed packet generator and traffic monitor module can pick up network addresses of network devices off the header of the packets that are being monitored and then add those network address onto a list of known network addresses and/or subnets.

In an example implementation, the modules of the network reachability module 604 cooperate to map out network reachability using multiple acknowledgement responses and Duplicate Selective Acknowledgement (DSACKs) responses. The network reachability module 604 attempts to reach all network address locations on the network from one central location with spoofed TCP packets. The network reachability module 604 monitors and can spoof into communications between devices in subnets in order to map currently available connections between subnets from the location of the security appliance in the network.

When two computers talk to each other across a network they use standard TCP/IP protocol and connections and then exchange communications with each other. TCP uses acknowledgment numbers to keep track of data in the transit between two-end host computing devices.

Support for Selective Acknowledgement (SACK) is negotiated at the beginning of a TCP connection; if both end host computing devices support it, then SACKs may be used. Both end host-computing devices can show their support of SACKs by, for example, the presence of the SACK permitted option in SYN packets.

The network reachability module 604 may send out spoofed TCP packets with the DSACK option flag. The network reachability module 604 can send out a spoofed TCP packet with the DSACK option flag and monitor for one or more responses to this transmission in the network traffic flow from an end computing device in its subnet in order to test/verify that an end computing device in its subnet is in fact accessible to and supports receiving, for example, a TCP reset/stop signal. This is somewhat a testing signal to see if the network reachability module 604 can send this command and actually affect that end-computing device. The network reachability module 604 upon sending out the spoofed TCP packet with the DSACK option flag and monitoring for its corresponding response can then implicitly know and register that a reset/stop signal would work on that end computing device in its subnet because both the TCP reset/stop signal and the DSACK option flag work in the network stack protocol in a similar way and if the end device supports a DSACK option flag then it will also support a TCP reset/stop signal. Generally, a TCP RESET instructs both sender and receiver to cease the current transfer of data. The network reachability module 604 would be able to know and register that it can affect an end computing device in its subnet being used by, potentially a malicious actor, when the network reachability module 604 would need to stop that end computing device in its subnet. Thus, the network reachability module 604 by using a DSACK option flag, the network reachability module 604 can checkout network devices in their subnets to know ahead of time in a non-intrusive manner, if the network reachability module 604 can use a TCP RESET on that network devices in its subnet. The network reachability module 604 utilizes a standard way that computing devices talk with each other across a network and simultaneously listens to the contents and type of communications occurring between the two computing devices in their subnets in order to error check and/or gain knowledge ahead of time whether the network reachability module 604 can send commands such as a TCP RESET/stop signal to affect that device in its subnet. Again, the DSACK will not actually stop anything, but will force the other computing device in its subnet to respond. Thus, the network reachability module 604 can in the future send other command signals such as a TCP RESET/stop signal to affect that other computing device in its subnet.

In a similar way, the network reachability module 604 can also send out a spoofed TCP packet with the DSACK option flag and monitor for a response to the spoofed packet in the network traffic flow to error check/troubleshoot to see if a location connected to a network is accessible during an initial setup and/or a configuration (roll out) of the network. This can also make deployment of the network different system much faster as well as allow a configuration of a network to occur in a quicker way. A cyber-security response-orchestrator engine must know 1) what network device in their subnets exist in a network and 2) which network device in their subnets can be communicated with. Due to this, a cyber-security response-orchestrator engine can be difficult and manpower intensive to rollout but now be performed in an autonomous way by the network reachability module 604. In addition, the tracking module can be configured to speed up a roll out by employing a practice where if a first device can be reached in a particular subnet then most likely every device in that subnet can be communicated with that particular route or pathway via that protocol.

FIG. 7 illustrates a block diagram of an embodiment of the cyber security appliance with a user interface module to generate categories of subnets that appear on a map of network reachability that 1) can receive and 2) that cannot receive protocol communications from the location of the host for the cyber-security response-orchestrator engine. The network reachability module with a user interface module in the cyber security appliance 700 connects to the network via probes.

FIG. 8 illustrates a block diagram of an embodiment of a user interface module to generate multiple categories of subnets that appear on the map of network reachability on a display screen.

An example map of network addresses that are reachable and/or not reachable by the cyber-security response-orchestrator engine is shown by the user interface module of the network reachability module 804. The reachability and/or non-reachability can be shown via a number of schemes including making reachable network addresses a first color, such as green (e.g. a green bubble), and non-reachable network addresses a second color, such as red (e.g. a red bubble). A list with three columns is also shown in this example with a time a gap was found and the trigger module sent a spoofed packet to see if a successful protocol communication could be established between the cyber security appliance and the target network address using the particular routing path tried by the tracking module, including port and/or sockets used, and at that time of day. For example, on the date 2019 Apr. 3 at 11:29 the trigger module sent a spoofed packet with the network address of the trigger network address of 209.237.196.128 'imitated/spoofed in' by the trigger module to a target network address of 192.168.130.58.

The map of reachability (and non-reachability) with its numerical details also has filters. The graphic user interface may have three of more filters to select what is shown, internal connections, external connections, and proxy connections. The Proxy filter indicates when a device on an internal subnet wants to communicate with a network address on an external subnet, and the network uses a proxy address in order to facilitate those communications. The Proxy filter selects spoofed transmissions and/or response communications when this situation happens and a proxy address was used.

Thus, multiple categories of subnets can be generated and appear on the map of network reachability on the display. One category may be blue bubbles appearing on the map of network reachability on the display. The category of blue bubbles indicates that the network reachability module 804 is aware that the subnet exists and has visibility over the subnet traffic but currently the network reachability module 804 has not been able to positively establish whether communications with a device in that subnet from the location of the cyber threat appliance will be successful. The other two example categories displayed may be i) green bubbles for successful communications with a device on that subnet or ii) red bubbles for unsuccessful communications over numerous occasions with different start times and potentially different routing paths but still no communications could be established with a device on that network address. The number of unsuccessful communications may be a configurable parameter by the user or determined by an Artificial Intelligence model cooperating with the cyber threat appliance monitoring this network.

The final result is a reachability map of the network, which outlines protected subnets (i.e., those the cyber-security response-orchestrator engine can reach with a TCP reset packet) and unprotected subnets (those that did not respond appropriately to the ACK) which would require a broader blocking action. The reachability map is visually displayed and has its own graphical user interface so the end-user can review the unprotected subnets. The trigger network address (in this example, the network address of the spoofed device) and the target network address (the device replying to the spoofed communication) are displayed in the reachability map for each reachability attempt.

The reachability map is visually displayed so, for example, an operator can troubleshoot aspects of the network. For example, an operator can troubleshoot if a specific network address is causing the condition of a network device in its subnet not being reachable by communications issued from the cyber-security response-orchestrator engine. The visualization of a map of reachability thus eases troubleshooting as well as gives a feeling of security to the end-user who can see where is protected and what needs to be done to get that network into a protected state.

When a customer configures their network devices and network addresses into a cyber security appliance, they may locate the appliance in a location that has limited access to other subnets due to network topology, or over time the cyber appliance may be cut off from new/existing subnets by network changes. In this case, the autonomous response module cannot provide targeted cover and must use broad, more disruptive actions like firewall-level blocks.

The troubleshooting and rollout module can simplify roll-out and give actual visibility of the protection of the network. The rollout procedures as well as mechanisms to check reachability can be contained and referenced by the troubleshooting and rollout module. The troubleshooting and rollout module provides an autonomous rollout and make recommendations on troubleshooting reachability. The trigger module and the tracking module are configured to cooperate to repeatedly go through and check all network addresses to see if at least one network device in each subnet can be reached, via the spoofed transmission and/or response communication, and then periodically recheck network addresses with network devices over time.

As a manner of continually updating its registered knowledge, the network reachability module 804 will occasionally send off a command to start the exchange of communications between it and another computing device. The network reachability module 804 periodically exchanges communications between the network reachability module 804 and each of the network devices in their subnets to continually map reachability and update a list of currently connectable network devices.

In light of the design automating rollout and reachability of the cyber security appliance, a human operator no longer must manually test each area of the network and see if a block of network reachability comes through. Instead, the network reachability module 804 can dynamically devise specific routes for packet traversal from successful ACK traversals and update them as each mapping is periodically revised. This reduces operator time significantly and creates an automated roll-out mechanism for the cyber-security response-orchestrator engine in that network.

Note, the trigger module factors in that 'it is not preferential' to perform the mapping at the same time every day (or during downtime) as the connections seen are not likely to be representative. For example, a device seen active during network downtime may be a device such as a network administration update server that connects to devices in many subnets as a nightly maintenance process, where spoofing that device will always be unsuccessful due to internal network rules or extra anti-spoofing protection for that network address. In that case, the network reachability module 804 could incorrectly mark the subnets as unreachable, as it cannot identify that the actual trigger network address has special conditions attached. If a repeated false positive is seen because of special IP conditions, users can provide a BPF (Berkley Packet Filter) for trigger network addresses and for target network addresses to blacklist.

In an embodiment, the network reachability module 804 can be configured to model the feedback from unsuccessful and successful ACKs to identify the optimum time of day to send the ACK in a communication gap, the best protocols to send the ACK on, the best time of day, etc. on an individual network.

The network reachability module 804 is configured to trace the number of packet hops before the packet is dropped, for unsuccessful ACKS where a large cluster of subnets are unreachable. The network reachability module 804 traces the number of packet hops before the packet is dropped to identify the potential roadblock (switch, router, firewall) for customer troubleshooting. The network reachability module 804 can model the distance between probes and specific subnets and the relative success rates (historically how often the probe has been able to reach a certain subnet) to define which probe should 'own' a subnet and be responsible for autonomous responses by the autonomous response module in order to control the devices in that subnet.

The network reachability module 804 is also configured to inform the end-user of unexpected network changes via the user interface and/or via a notification to a specified e-mail address, text number, etc. The network reachability module 804 is configured to provide end-user notification when a subnet moves out of protection that was previously protected or an unexpected change to the subnets. The network reachability module 804 is aware of previous changes to that subnet (historic reachability) to rule out regular changes.

The network reachability module 804 is configured to provide awareness of the locations of firewalls controllable by the cyber threat defense system (and the ports those firewalls are configured to control) so that in the visual interface, distinction can be made between RST protected, RST unprotected but Firewall protected (external to internal communications) and totally unprotected subnets.

The network reachability module 804 is configured to model reachability over a certain time frame in the visual output for situations where subnets become unreachable for power-failure or maintenance reasons. Here, the last 24 hours would be standard view with an operator option to show a seven-day average to account for these scenarios. For example, subnet A was reachable 100% of the time, subnet B was only reachable 85% of the time.

General Aspects of an Example Cyber Security Appliance

In an example, a cyber-threat module may reference multiple artificial intelligence models. The system may use at least three separate machine learning models. Each machine learning model may be trained on specific aspects of the normal 'pattern of life'/behavior for the system such as devices, users, network traffic flow, outputs from one or more cyber security analysis tools analyzing the system, etc. One or more machine learning models may also be trained on characteristics and aspects of all manner of types of cyber threats. A determination is made of a threat risk parameter that factors in what is a likelihood of a chain of one or more unusual behaviors of the system activity and user activity under analysis that fall outside of being a normal benign behavior. Next, an autonomous response module is used, rather than a human taking an action, to cause one or more autonomous rapid actions to be taken to contain the cyber-threat when the threat risk parameter from the cyber-threat module is equal to or above an actionable threshold.

In an example, an artificial intelligence based analyst sees something abnormal or suspicious from the normal pattern of life, then the AI analyst forms one or more hypotheses on what are the possibilities to cause this abnormal behavior or suspicious activity. Next, then the AI analyst finds evidence/collects data to support or refute each possible hypothesis, assigns a threat level and an optional probability, and then generates a formal report. The AI analyst is configured to protect a system under analysis, including but not limited to a network, from cyber threats. The AI cyber-security analyst may include a trigger module, a gatherer module, an analyzer module, an assessment module, and an optional formatting module. The trigger module may identify—with the use of the one or more AI models trained with machine learning on a normal behavior of the system—an abnormal behavior, including any suspicious activity, from one or more entities in the system under analysis. The gatherer module may initiate a collection of data to support or refute each of the one or more possible cyber threat hypotheses that could include this abnormal behavior or suspicious activity by the one or more AI models trained on possible cyber threats. The gatherer module may further extract data at the request of the analyzer module on each possible hypothetical threat that would include the abnormal behavior or suspicious activity and then filter that collection of data down to relevant points of data to either 1) support or 2) refute each particular hypothesis of what the cyber threat, the suspicious activity and/or abnormal behavior relates to. The gatherer module may send the filtered down relevant points of data to either 1) support or 2) refute each particular hypothesis to the analyzer module, comprised of one or more algorithms used by the AI models trained with machine learning on possible cyber threats to make a determination on a probable likelihood of whether that particular hypothesis is supported or refuted. The analyzer module may form one or more hypotheses on what are a possible set of activities including cyber threats that could include the identified abnormal behavior and/or suspicious activity from the trigger module with one or more AI models trained with machine learning on possible cyber threats. The analyzer module may request further data from the gatherer module to perform this analysis. The analyzer module may further analyze a collection of system data, including metrics data, to support or refute each of the one or more possible cyber threat hypotheses that could include the identified abnormal behavior and/or suspicious activity data with the one or more AI models trained with machine learning on possible cyber threats. The analyzer module generates one or more supported possible cyber threat hypotheses from the possible set of cyber threat hypotheses. The assessment module may assign a probability, or confidence level, of a given cyber threat hypothesis that is supported and a threat level posed by that cyber threat hypothesis, which includes this abnormal behavior or suspicious activity, with the one or more AI models trained on possible cyber threats. The formatting module may format, present a rank for, and output one or more supported possible cyber threat hypotheses from the analyzer module into a formalized report, from a first template, such as a dynamic human-supplied and/or machine created template, that can be outputted for a human user's consumption in a medium of any of 1) printable report, 2) presented digitally on a user interface, or 3) both, or in a machine readable format for further reinforcement machine learning. The trigger module, analyzer module and formatting module cooperate to improve the analysis and formalized report generation with less repetition to consume CPU cycles more efficiently and effectively than humans repetitively going through these steps and re-duplicating steps to filter and rank the one or more supported possible cyber threat hypotheses from the possible set of cyber threat hypotheses.

The method and system can be arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

FIG. 9 illustrates a block diagram of an embodiment of an example cyber security appliance using a network reachability module mapping and tracking network reachability in an example network. The example network FIG. 9 illustrates a network of computer systems 950 using the cyber security appliance 900. The system depicted by FIG. 9 is a simplified illustration, which is provided for ease of explanation of the invention. The system 950 comprises a first computer system 10 within a building, which uses the cyber security appliance to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, computer 1 on the first computer system 10 has the cyber security appliance 900 and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 9.

The computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM. The same employee virtually never accesses the employee time sheets, very rarely connects to the company's Atlanta network and has no dealings in South-East Asia. The cyber security appliance takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The cyber security appliance is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the cyber security appliance installed on the computer 1.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber security appliance builds a sophisticated 'pattern of life'—that understands what represents normality for every person, device, and network activity in the system being protected by the cyber security appliance.

The cyber security appliance has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches:

The machine learning learns what is normal within a network—it does not depend upon knowledge of previous attacks.

The machine learning thrives on the scale, complexity and diversity of modern businesses, where every device and person is slightly different.

The machine learning turns the innovation of attackers against them—any unusual activity is visible.

The machine learning constantly revisits assumptions about behavior, using probabilistic mathematics.

The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

Thought: it uses past information and insights to form its judgments;
Real time: the system processes information as it goes; and
Self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber security appliance's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber security appliance uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber security appliance's unsupervised machine learning on cyber security is transformative:

Threats from within, which would otherwise go undetected, can be spotted, highlighted, contextually prioritized and isolated using these algorithms.

The application of machine learning has the potential to provide total network visibility and far greater detection levels, ensuring that networks have an internal defense mechanism.

Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber security appliance's machine learning algorithms and approaches is as follows.

The cyber security appliance's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber security appliance's approach accounts for the inevitable ambiguities that exist in data, and distinguishes between the subtly differing levels of evidence that different pieces of data may contain. Instead of generating the simple binary outputs 'malicious' or 'benign,' the cyber security appliance's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber security appliance mathematically characterizes what constitutes 'normal' behavior based on the analysis of a large number/set of different measures of a devices network behavior, examples include:
Server access;
Data access;
Timings of events;
Credential use;
DNS requests; and
other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber security appliance leverages the power of unsupervised learning to algorithmically identify naturally occurring groupings of devices, a task which is impossible to do manually on even modestly sized networks.

In order to achieve as holistic a view of the relationships within the network as possible, the cyber security appliance simultaneously employs a number of different clustering methods including matrix based clustering, density based clustering and hierarchical clustering techniques. The resulting clusters are then used to inform the modeling of the normative behaviors of individual devices.
Clustering: At a glance:
Analyzes behavior in the context of other similar devices on the network;
Algorithms identify naturally occurring groupings of devices—impossible to do manually; and
Simultaneously runs a number of different clustering methods to inform the models.

Network Topology

Any cyber security appliance must also recognize that a network is far more than the sum of its individual parts, with much of its meaning contained in the relationships among its different entities, and that complex threats can often induce subtle changes in this network structure. To capture such threats, the cyber security appliance employs several different mathematical methods in order to be able to model multiple facets of a networks topology.

One approach is based on iterative matrix methods that reveal important connectivity structures within the network. In tandem with these, the cyber security appliance has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber security appliance has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber security appliance takes advantage of the power of Recursive Bayesian Estimation (RBE) via an implementation of the Bayes filter.

Using RBE, the cyber security appliance's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber security appliance's innovative approach to cyber security has pioneered the use of Bayesian methods for tracking changing device behaviors and computer network structures. The core of the cyber security appliance's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber security appliance uses mathematical analysis and machine learning to detect potential threats, allowing the system to stay ahead of evolving risks. The cyber security appliance approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber security appliance can create digital antibodies automatically, as an immediate response to the most threatening cyber breaches. The cyber security appliance approach both detects and defends against cyber threat. Genuine unsupervised machine learning eliminates the dependence on signature-based approaches to cyber security, which are not working. The cyber security appliance's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The cyber security appliance shall now be described in further detail with reference to a flow of the process carried out by the cyber security appliance for automatic detection of cyber threats through probabilistic change in normal behavior through the application of an unsupervised Bayesian mathematical model to detect behavioral change in computers and computer networks.

The core cyber security appliance is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:
Raw network IP traffic captured from an IP or other network TAP or SPAN port;
Machine generated log files;
Building access ("swipe card") systems;
IP or non IP data flowing over an Industrial Control System (ICS) distributed network;
Individual machine, peripheral or component power usage;
Telecommunication signal strength; and/or
Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:
The number of bytes of data entering or leaving a networked device per time interval.
File access.
The commonality/rarity of a communications process
Invalid SSL certification.
Failed authorization attempt.
Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:
The number of multicasts per time interval originating from a networked device and intended to reach publicly addressable IP ranges.
The number of internal link-local IP Broadcast requests originating from a networked device.
The size of the packet payload data.
The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:
The number of DNS requests a networked device generates per time interval, again either to any definable target network range or in total.
The number of SMTP, POP or IMAP logins or login failures a machine generates per time interval.
The number of LDAP logins or login failures a generated.
Data transferred via file sharing protocols such as SMB, SMB2, FTP, etc.
Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally, the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and/or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the cyber security appliance may be arranged to look for any possible threat, in practice the system may keep watch for one or more specific threats depending on the network in which the cyber security appliance is being used. For example, the cyber security appliance provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the cyber security appliance computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning/Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The cyber security appliance that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the cyber security appliance consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber security appliance.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). The client computing system can include, for example, the software application or the hardware-based system in which the client computing system may be able to exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. A module may be implemented by hardware electronic circuits, hardware electronic circuit cooperating with software, and/or software stored in a memory, cache, etc. which when executed by one or more processor will cause the functions of the module to occur in cooperation with other components in the system.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
a network reachability module configured to map and dynamically track network reachability of a cyber-security response-orchestrator engine, where the cyber-security response-orchestrator engine is configured to take autonomous actions, without a human to initiate the actions, to mitigate a detected cyber threat,
where the network reachability module has a tracking module to 1) monitor network traffic and 2) keep a list of known devices and/or known subnets on the network, which is dynamically tracked and updated as previously unknown devices and subnets on the network are detected, and
where the network reachability module has a trigger module configured to cooperate with the tracking module, where the trigger module is configured to generate a spoofed transmission and/or response communication, supported by a network protocol used by the network, that is used to map network reachability of i) network devices, ii) network addresses, and iii) any combination of both, which either 1) can receive or 2) cannot receive protocol communications from a location of a host for the cyber-security response-orchestrator engine.

2. The apparatus of claim 1, where the trigger module and the tracking module are further configured to cooperate to repeatedly, on their own initiative, go through and check network addresses to see if at least one network device in each known subnet can be reached, via the generated spoofed transmission and/or response communication, and then periodically recheck the network addresses with network devices in each known subnet over time, and where the network reachability module is configured to combine i) the tracking module's monitoring of network traffic and keeping the list of known devices and/or known subnets on the network, with ii) the trigger module's autonomous periodic generation of the spoofed transmission and/or response communication to check whether if at least one network address in each subnet, for each of the known subnets, can be reached, where the combination essentially automates a rollout process for the cyber-security response-orchestrator engine.

3. The apparatus of claim 1, where the trigger module is configured to deliberately generate any of i) a first spoofed transmission communication or ii) a first response communication with falsified identity information to imitate a network address of a first device sending legitimate communications to a second device on the network, and where the trigger module is configured to deliberately generate the first spoofed transmission or the first response communication to also have some information or characteristic that makes a reply by the second device on the network to this spoofed communication uniquely identifiable from any legitimate communications between the first device and the second device, where the tracking module is configured to identify a subsequent communication in a stream of communications between the first device and the second device that specifically corresponds back to the generated first spoofed transmission communication or the generated first spoofed response communication.

4. The apparatus of claim 3, where the trigger module is further configured to generate the first spoofed response communication in a form of an acknowledge packet with falsified identity information to imitate a network address of the first device sending legitimate communications to the second device on the network as well as the acknowledge packet was generated with the information and/or characteristic that makes the reply from the second device to the spoofed acknowledge packet uniquely identifiable when a subsequent communication is sent by the second device on the network.

5. The apparatus of claim 1, where the tracking module is configured to determine when a connection has been established for legitimate communications between a first network device in its subnet and a second device at a target address, where the gap determination module is configured to determine when a gap of time is found to communicate to the trigger module to send the generated spoofed transmission and/or response communication, which is addressed to go the target address, via the established connection, in order to check if a successful protocol communication could be reached from the cyber-security response-orchestrator engine to the second device at the target network address, where the cyber-security response-orchestrator engine is further configured to carry out, as at least one of the autonomous actions that the cyber-security response-orchestrator engine can take, is to orchestrate cutting off network connections between the first network device and the second device when the cyber threat is detected.

6. The apparatus of claim 1, where a user interface module is configured to cooperate with a data store that is configured to store the network reachability of i) network devices, ii) network addresses, and iii) any combination of both, which 1) can receive or 2) cannot receive protocol communications from a location of a host for the cyber-security response-orchestrator engine, in order to generate a graphical map of network addresses that 1) can receive or 2) cannot receive protocol communications from the location of the host for the cyber-security response-orchestrator engine, where the user interface module is further configured to generate multiple categories of subnets that appear on the map of network reachability on a display screen, where the multiple categories of subnets graphically represented on the display screen include at least a first category of subnets that 1) can receive and 2) a second category of subnets that cannot receive protocol communications from the location of the host for the cyber-security response-orchestrator engine.

7. The apparatus of claim 1, where the trigger module and the tracking module are further configured to cooperate, where the tracking module is configured to track a time of day and a traversal path of the spoofed communication as well as a number of times that the generated spoofed protocol communication could not be received from a location of a host for the cyber-security response-orchestrator engine, where the trigger module is configured with intelligence to vary any of the time of day and the traversal path of the generated spoofed communication when the number of times that previous generated spoofed protocol communications could not be received at that time of day or via that traversal path exceeds a threshold amount.

8. The apparatus of claim 1, where the network reachability module is configured to supply information concerning the reachability of a first device on a first subnet mapped by the network reachability module to the cyber-security response-orchestrator engine in order facilitate the cyber-security response-orchestrator engine to select a possible autonomous action when the first device in the network is exhibiting malicious behavior, where the possible autonomous action includes when the cyber-security response-orchestrator engine cannot reach the first device in the first subnet via a protocol communication, then the cyber-security response-orchestrator engine must use an alternative approach, and not attempt to generate a direct protocol communication to the first device in the first subnet, in order to mitigate the detected cyber threat.

9. The apparatus of claim 1, further comprising:
a gap determination module configured to cooperate with the trigger module, where the gap determination module is configured to determine whether a connection is open between a first device and a second device, where the gap determination module is further configured to examine i) a type of protocol communication occurring between a first device sending a protocol communication and a second device receiving the protocol communication, and ii) whether 1) legitimate communications are currently in flight in the traversal path between the first device and the second device or 2) a gap of time is currently happening in an exchange of protocol communications, where the gap determination module is further configured to notify the trigger module an opportunity exists to send the generated spoofed protocol communication when the connection is open between the first device and the second device and when the gap of time, above a threshold amount, is currently happening in the exchange of protocol communications between the first device and the second device.

10. The apparatus of claim 9, where the gap determination module is further configured to dynamically determine the threshold amount of time for the gap determination based on at least one of a) the number of hops away between a source address and a target address for the first device and the second device and b) previously successful timeframes for spoofed transmissions for the given protocol and the given network.

11. A method for a cyber-security system, comprising:
mapping and dynamically tracking network reachability of a cyber-security response-orchestrator engine,
taking autonomous actions, without a human to initiate the actions, with a the cyber-security response-orchestrator engine to mitigate a detected cyber threat,
monitoring network traffic and 2) keeping a list of known devices and/or known subnets on the network, which is dynamically tracked and updated as previously unknown devices and subnets on the network are detected, and
generating a spoofed transmission and/or response communication, supported by a network protocol used by the network, that is used to map network reachability of i) network devices, ii) network addresses, and iii) any combination of both, which either 1) can receive or 2) cannot receive protocol communications from a location of a host for the cyber-security response-orchestrator engine.

12. The method of claim 11, further comprising:
checking network addresses to see if at least one network device in each known subnet can be reached, via the generated spoofed transmission and/or response communication repeatedly, without a human initiating that checking, and
periodically rechecking the network addresses with network devices in each known subnet over time, and where the network reachability module is configured to combine i) the tracking module's monitoring of network traffic and keeping the list of known devices and/or known subnets on the network, with ii) the trigger module's autonomous periodic generation of the spoofed transmission and/or response communication to check whether if at least one network address in each subnet, for each of the known subnets, can be reached, where the combination essentially automates a rollout process for the cyber-security response-orchestrator engine.

13. The method of claim 11, further comprising:
deliberately generating any of i) a first spoofed transmission communication or ii) a first response communication with falsified identity information to imitate a network address of a first device sending legitimate communications to a second device on the network,
deliberately generating the first spoofed transmission or the first response communication to also have some information or characteristic that makes a reply by the second device on the network to this spoofed communication uniquely identifiable from any legitimate communications between the first device and the second device, and
identifying a subsequent communication in a stream of communications between the first device and the second device that specifically corresponds back to the generated first spoofed transmission communication or the generated first spoofed response communication.

14. The method of claim 13, further comprising:
generating the first spoofed response communication in a form of an acknowledge packet with falsified identity information to imitate a network address of the first device sending legitimate communications to the second device on the network as well as the acknowledge packet was generated with the information and/or characteristic that makes the reply from the second device to the spoofed acknowledge packet uniquely identifiable when a subsequent communication is sent by the second device on the network.

15. The method of claim 11, further comprising:

determining when a connection has been established for legitimate communications between a first network device in its subnet and a second device at a target address, determining next when a gap of time is found to communicate to send the generated spoofed transmission and/or response communication, which is addressed to go the target address, via the established connection, in order to check if a successful protocol communication could be reached from the cyber-security response-orchestrator engine to the second device at the target network address, and carrying out, as at least one of the autonomous actions that can be taken, is to orchestrate cutting off network connections between the first network device and the second device when the cyber threat is detected.

16. The method of claim 11, further comprising:

storing the network reachability of i) network devices, ii) network addresses, and iii) any combination of both, which 1) can receive or 2) cannot receive protocol communications from a location of a host for the cyber-security response-orchestrator engine, generating a graphical map of network addresses that 1) can receive or 2) cannot receive protocol communications from the location of the host for the cyber-security response-orchestrator engine, and generating multiple categories of subnets that appear on the map of network reachability on a display screen, where the multiple categories of subnets graphically represented on the display screen include at least a first category of subnets that 1) can receive and 2) a second category of subnets that cannot receive protocol communications from the location of the host for the cyber-security response-orchestrator engine.

17. The method of claim 11, further comprising:

tracking a time of day and a traversal path of the spoofed communication as well as a number of times that the generated spoofed protocol communication could not be received from a location of a host for the cyber-security response-orchestrator engine, and varying any of the time of day and the traversal path of the generated spoofed communication when the number of times that previous generated spoofed protocol communications could not be received at that time of day or via that traversal path exceeds a threshold amount.

18. The method of claim 11, further comprising:

supplying information concerning the reachability of a first device on a first subnet mapped by a network reachability module to the cyber-security response-orchestrator engine in order facilitate the cyber-security response-orchestrator engine to select a possible autonomous action when the first device in the network is exhibiting malicious behavior, where the possible autonomous action includes when the cyber-security response-orchestrator engine cannot reach the first device in the first subnet via a protocol communication, then the cyber-security response-orchestrator engine must use an alternative approach, and not attempt to generate a direct protocol communication to the first device in the first subnet, in order to mitigate the detected cyber threat.

19. The method of claim 11, further comprising:

determining whether a connection is open between a first device and a second device, examining i) a type of protocol communication occurring between a first device sending a protocol communication and a second device receiving the protocol communication, and ii) whether 1) legitimate communications are currently in flight in the traversal path between the first device and the second device or 2) a gap of time is currently happening in an exchange of protocol communications, and notifying that an opportunity exists to send the generated spoofed protocol communication when the connection is open between the first device and the second device and when the gap of time, above a threshold amount, is currently happening in the exchange of protocol communications between the first device and the second device.

20. A non-transitory computer readable medium comprising computer readable code operable, when executed by one or more processing apparatuses in the computer system is configured to instruct a computing device to perform steps as follows, comprising:

mapping and dynamically tracking network reachability of a cyber-security response-orchestrator engine, taking autonomous actions, without a human to initiate the actions, with a the cyber-security response-orchestrator engine to mitigate a detected cyber threat, monitoring network traffic and 2) keeping a list of known devices and/or known subnets on the network, which is dynamically tracked and updated as previously unknown devices and subnets on the network are detected, and generating a spoofed transmission and/or response communication, supported by a network protocol used by the network, that is used to map network reachability of i) network devices, ii) network addresses, and iii) any combination of both, which either 1) can receive or 2) cannot receive protocol communications from a location of a host for the cyber-security response-orchestrator engine.

* * * * *